(12) United States Patent
Davis

(10) Patent No.: US 9,182,239 B2
(45) Date of Patent: Nov. 10, 2015

(54) DISPLAYING LAYLINES

(71) Applicant: NAVICO HOLDING AS, Egersund (NO)

(72) Inventor: Alan Davis, Romsey (GB)

(73) Assignee: Navico Holding AS, Egersund (NO)

( * ) Notice: Subject to any disclaimer, the term of this patent is extended or adjusted under 35 U.S.C. 154(b) by 0 days.

(21) Appl. No.: 14/029,339

(22) Filed: Sep. 17, 2013

(65) Prior Publication Data

US 2014/0129131 A1      May 8, 2014

Related U.S. Application Data

(60) Provisional application No. 61/723,167, filed on Nov. 6, 2012.

(51) Int. Cl.
*G01C 21/00* (2006.01)
*G01C 21/20* (2006.01)
*B63B 49/00* (2006.01)

(52) U.S. Cl.
CPC .............. *G01C 21/203* (2013.01); *B63B 49/00* (2013.01)

(58) Field of Classification Search
CPC ..... G01C 21/203; G06G 1/0052; B63B 49/00
USPC .......................................................... 701/440
See application file for complete search history.

(56) References Cited

U.S. PATENT DOCUMENTS

| | | |
|---|---|---|
| 4,829,493 A | 5/1989 | Bailey |
| 4,879,697 A | 11/1989 | Lowrance et al. |
| 5,025,423 A | 6/1991 | Earp |
| 5,191,341 A | 3/1993 | Gouard et al. |
| 5,537,380 A | 7/1996 | Sprankle, Jr. et al. |
| 6,225,984 B1 | 5/2001 | Crawford |
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,761,692 B2 | 7/2004 | Angelsen et al. |
| 6,816,782 B1 | 11/2004 | Walters et al. |
| 7,002,579 B2 | 2/2006 | Olson |
| 7,236,426 B2 | 6/2007 | Turner et al. |
| 7,430,461 B1 | 9/2008 | Michaels |

(Continued)

OTHER PUBLICATIONS

Virtual Skipper Wiki, retrieved from the Internet Archive Wayback Machine: https://web.archive.org/web/20100721160843/http://vsk.wikia.com/wiki/Layline, on Jul. 21, 2010.*

(Continued)

*Primary Examiner* — Maceeh Anwari
(74) *Attorney, Agent, or Firm* — Pramudji Law Group PLLC; Ari Pramudji

(57) ABSTRACT

Various implementations described herein are directed to displaying laylines. In one implementation, a method may include receiving marine electronics data at a marine electronics device disposed on a vessel. The method may also include receiving a navigational location. The method may further include calculating one or more laylines based on the navigational location and the marine electronics data. The method may additionally include displaying a vessel marker representing the vessel, a compass scale, and the one or more laylines on a display screen of the marine electronics device, where the vessel marker, the compass scale, and the one or more laylines are integrated on the display screen.

17 Claims, 4 Drawing Sheets

(56) References Cited

U.S. PATENT DOCUMENTS

| | | |
|---|---|---|
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,870,496 B1 | 1/2011 | Sherwani |
| 7,890,867 B1 | 2/2011 | Margulis |
| 8,019,532 B2 | 9/2011 | Sheha et al. |
| 8,063,540 B2 | 11/2011 | Angelsen et al. |
| 2002/0035574 A1 | 3/2002 | Dumas |
| 2002/0093541 A1 | 7/2002 | Schileru-Key |
| 2004/0193364 A1 | 9/2004 | Chojnacki |
| 2005/0102101 A1 | 5/2005 | Beesley et al. |
| 2006/0013066 A1 | 1/2006 | Nishimori et al. |
| 2006/0119585 A1 | 6/2006 | Skinner |
| 2006/0224940 A1 | 10/2006 | Lee |
| 2008/0126935 A1 | 5/2008 | Blomgren |
| 2008/0204424 A1 | 8/2008 | Jin et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1* | 11/2009 | Summers ............... 701/202 |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1* | 9/2010 | Kubota et al. ............... 701/207 |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0185801 A1 | 7/2012 | Madonna et al. |
| 2013/0007665 A1 | 1/2013 | Chaudhri et al. |

OTHER PUBLICATIONS

PCT International Search Report and Written Opinion; PCT/IB2013/060285; Feb. 18, 2014.

PCT International Search Report and Written Opinion; PCT/US2013/047869; Oct. 21, 2013.

PCT International Search Report and Written Opinion; PCT/US2013/048177; Oct. 21, 2013.

PCT International Search Report and Written Opinion; PCT/US2013/048129; Oct. 17, 2013.

PCT International Search Report and Written Opinion; PCT/US2013/047926; Oct. 11, 2013.

PCT International Search Report and Written Opinion; PCT/US2013/047645; Sep. 27, 2013.

* cited by examiner

DISPLAYING LAYLINES

CROSS-REFERENCE TO RELATED APPLICATIONS

This application claims the benefit of U.S. Provisional Patent Application Ser. No. 61/723,167, filed Nov. 6, 2012, titled SAILING SCREEN, and the disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Various forms of marine electronics data may be processed and/or displayed using a computing device disposed aboard a vessel. In one scenario, the computing device may include a multi-function display (MFD). Marine electronics data displayed using the computing device may be used to help navigate the vessel, and the data may include, for example, sonar data, chart data, radar data, or navigation data such as laylines.

SUMMARY

Described herein are implementations of various technologies for displaying laylines. In one implementation, a method may include receiving marine electronics data at a marine electronics device disposed on a vessel. The method may also include receiving a navigational location. The method may further include calculating one or more laylines based on the navigational location and the marine electronics data. The method may additionally include displaying a vessel marker representing the vessel, a compass scale, and the one or more laylines on a display screen of the marine electronics device, where the vessel marker, the compass scale, and the one or more laylines are integrated on the display screen.

In another implementation, a non-transitory computer-readable medium having stored thereon a plurality of computer-executable instructions which, when executed by a computer, may cause the computer to receive marine electronics data at a marine electronics device disposed on a vessel. The computer-executable instructions may also cause the computer to receive a navigational location. The computer-executable instructions may further cause the computer to calculate one or more laylines based on the navigational location and the marine electronics data. The computer-executable instructions may additionally cause the computer to display a vessel marker representing the vessel, a compass scale, and the one or more laylines on a display screen of the marine electronics device, where the vessel marker, the compass scale, and the one or more laylines are integrated on the display screen.

In yet another implementation, an apparatus for displaying marine electronics navigation data may include one or more processors and a display screen configured to display the marine electronics data. The apparatus may also include memory having a plurality of executable instructions which, when executed by the one or more processors, cause the one or more processors to receive marine electronics data at a marine electronics device disposed on a vessel. The executable instructions may also cause the one or more processors to receive a navigational location. The executable instructions may further cause the one or more processors to calculate one or more laylines based on the navigational location and the marine electronics data. The executable instructions may additionally cause the one or more processors to display a vessel marker representing the vessel, a compass scale, and the one or more laylines on a display screen of the marine electronics device, where the vessel marker, the compass scale, and the one or more laylines are integrated on the display screen.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
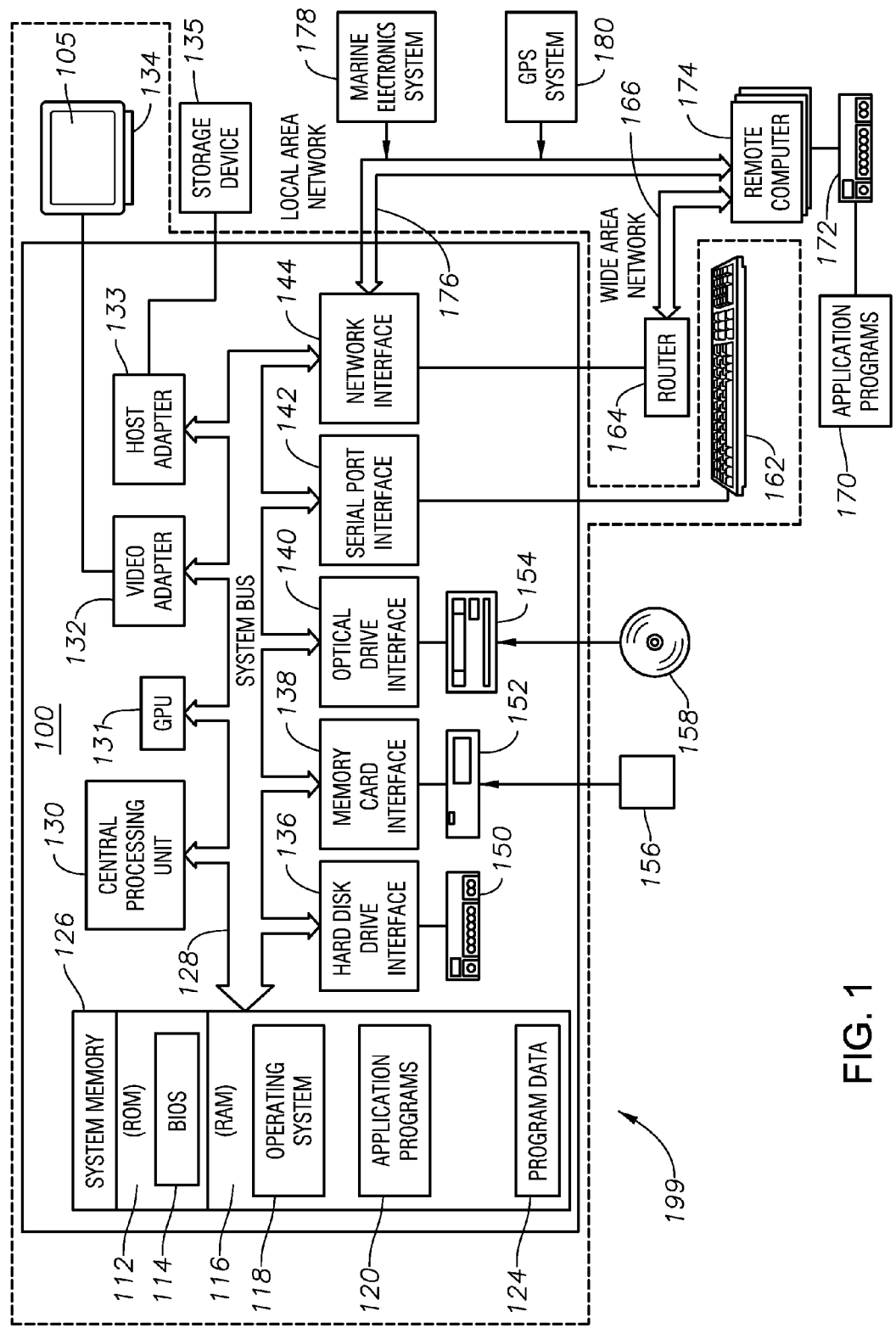
FIG. 1 illustrates a schematic diagram of a marine electronics device having a computing system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of displaying laylines described herein will now be described in more detail with reference to FIGS. 1-4.

Marine Electronics Device

A vessel traversing through water may use equipment to assist an operator of the vessel with navigation and other functions. The vessel may be a surface water vehicle, a submersible water vehicle, or any other implementation known to those skilled in the art. In one implementation, the equipment may include a marine electronics device disposed on board the vessel. The marine electronics device may be any computing implementation known to those skilled in the art, including a multi-function display (MFD), as further described below.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

FIG. 1 illustrates a schematic diagram of a marine electronics device 199 having a computing system 100 in accordance with implementations of various techniques described herein. The marine electronics device 199 may be any type of electrical and/or electronics device capable of processing data via the computing system 100. In one implementation, the marine electronics device 199 may be a marine instrument, such that the marine electronics device 199 may use the computing system 100 to display and/or process one or more types of marine electronics data, such as chart data, sonar data, structure data, radar data, navigation data, or any other type known to those skilled in the art. In a further implementation, the marine electronics device 199 may be a multi-function display (MFD), such that the marine electronics device 199 may be capable of displaying and/or processing multiple types of marine electronics data.

The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used. The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 may include a microprocessor, a microcontroller, a processor, a programmable integrated circuit, or a combination thereof. The CPU 130 can comprise an off-the-shelf processor such as a Reduced Instruction Set Computer (RISC), or a Microprocessor without Interlocked Pipeline Stages (MIPS) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a screen 105. The screen 105 can be sensitive to heat or touching (now collectively referred to as a "touch screen").

The system bus 128 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide nonvolatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The router 164 may be connected to the system bus 128 via a network interface 144. The remote computers 174 can also include hard disks 172 that store application programs 170.

In another implementation, the computing system 100 may also connect to one or more remote computers 174 via local area network (LAN) 176 or the WAN 166. When using a LAN networking environment, the computing system 100 may be connected to the LAN 176 through the network interface or adapter 144. The LAN 176 may be implemented via a wired connection or a wireless connection. The LAN 176 may be implemented using Wi-Fi technology, cellular technology, or any other implementation known to those skilled in the art. The network interface 144 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 174. It will be appreciated that the network connections shown are exemplary and other means of establishing a communications link between the computer systems may be used.

A number of program modules may be stored on the hard disk 150, memory card 156, optical disk 158, ROM 112 or RAM 116, including an operating system 118, one or more application programs 120, and program data 124. In certain implementations, the hard disk 150 may store a database system. The database system could include, for example, recorded points. The application programs 120 may include various mobile applications ("apps") and other applications configured to perform various methods and techniques described herein. The operating system 118 may be any suitable operating system that may control the operation of a networked personal or server computer.

A user may enter commands and information into the computing system 100 through input devices such as buttons 162. Other input devices may include a microphone (not shown). These and other input devices may be connected to the CPU 130 through a serial port interface 142 coupled to system bus 128, but may be connected by other interfaces, such as a parallel port, game port or a universal serial bus (USB). In another implementation, the computing system 100, the monitor 134, the screen 105, and the buttons 162 may be integrated into a console of the marine electronics device 199.

Certain implementations may be configured to be connected to a GPS system 180, and/or a marine electronics system 178. The GPS system 180, and/or marine electronics system 178 may be connected via the network interface 144. The marine electronics system 178 may include one or more components disposed at various locations on the vessel. In particular, the marine electronics system 178 may include one or more marine electronics data modules, sensors, instrumentation, and/or any other devices known to those skilled in the art which may transmit marine electronics data to the marine electronics device 199 for processing and/or display. The marine electronics data transmitted to the marine electronics device 199 may include chart data, sonar data, structure data, radar data, navigation data, or any other type known to those skilled in the art. For example, the marine electronics system 178 may include a paddlewheel sensor, a compass heading sensor, and the like. In such an example, the paddlewheel sensor may transmit speed data and the compass heading sensor may transmit heading data to the marine electronics device 199.

Conning Display with Laylines

Figure 2:
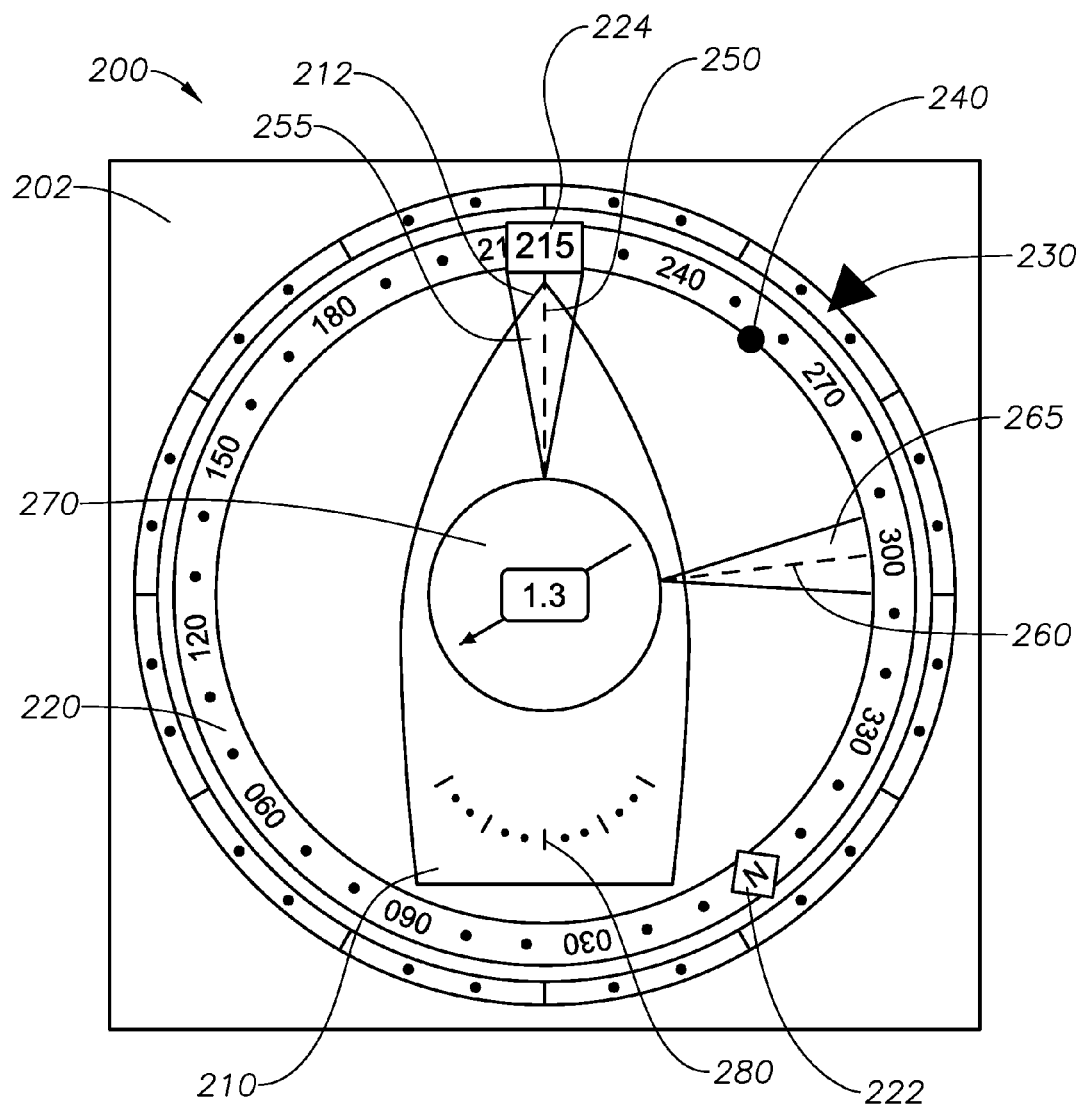
FIG. 2 illustrates a schematic diagram of a screen of a marine electronics device in accordance with implementations of various techniques described herein.

As described above, the marine electronics device 199 may be used to display marine electronics data on the screen 105, such as chart data, sonar data, structure data, radar data, navigation data, or any other type known to those skilled in the art. FIG. 2 illustrates a schematic diagram of a screen 200 of a marine electronics device in accordance with implementations of various techniques described herein. Screen 200 may be similar to the screen 105 and the marine electronics device may be similar to the marine electronics device 199 described above.

As illustrated, the screen 200 may display marine electronics data in the configuration of a conning display 202. The conning display 202 may show one or more types of marine electronics data during a vessel's operation, where the data may be grouped and displayed around and/or on a representation of the vessel. As shown, the screen 200 may include a vessel marker 210, where the vessel marker 210 may be an outline of a vessel. In other implementations, the vessel marker 210 may be a graphical illustration of a vessel, a symbol of a vessel, or any other representation of a vessel known to those skilled in the art. In one implementation, the vessel marker 210 may be oriented such that a bow portion 212 of the vessel marker 210 is closer to a top of the screen 200 than other portions of the vessel marker 210, where the bow portion 212 represents a bow of the vessel.

The conning display 202 may also include a compass scale 220, where the compass scale 220 displays directional data transmitted to the marine electronics device from one or more instrumentation, such as the instrumentation of the marine electronics system 178 described above. In one implementation, the compass scale 220 may be similar to a compass rose, with angle markings in degrees and/or numerical values of angles illustrated along the compass scale 220. The directional data displayed on the compass scale may include a direction for true north, a direction for a course over ground (COG), a heading of the vessel, and/or the like.

The compass scale 220 may be visually integrated with the vessel marker 210 in the conning display 202. For example, in one implementation, the compass scale 220 may be displayed around the vessel marker 210, such that the vessel marker 210 may be centered within the compass scale 220. The directional data may be updated as the vessel traverses through water, which may cause the compass scale 220 to rotate with respect to the vessel marker 210. In another implementation, the vessel marker 210 may instead rotate with respect to the compass scale 220. The compass scale 220 and/or the vessel marker 210 may rotate so that the bow portion 212 may point to the compass scale 220 at an angle substantially matching the heading of the vessel.

In another implementation, a true north indicator 222, a heading indicator 224, and/or a COG indicator (not shown) may be positioned on the compass scale 220. The true north indicator 222 may be placed along the compass scale 220 at a position indicating the direction for true north relative to the vessel. Similarly, the COG indicator may be placed along the compass scale 220 at a position indicating the direction for the COG for the vessel. The heading indicator 224 may also be placed along the compass scale 220 at position indicating the heading of the vessel, and the heading indicator 224 may also display a numerical value for the heading.

The conning display 202 may also include a true wind indicator 230, where the true wind indicator 230 may be based on wind data transmitted to the marine electronics device from one or more instrumentation, such as those of the marine electronics system 178 described above. In one implementation, the true wind indicator 230 may be displayed on or proximate to the compass scale 220.

The true wind indicator 230 may generally point towards the vessel marker 210 and the compass scale 220, and may be oriented such that the true wind indicator 230 graphically indicates a true wind angle and a true wind direction. The true wind angle may be equal to an angle of the true wind relative to the bow of the vessel. In one implementation, the true wind indicator 230 may be oriented so that its angle relative to the bow portion 212 is approximately equal to the true wind angle. For example, as illustrated in FIG. 2, the true wind indicator 230 may form an angle relative to the bow portion 212 that may be equal to about forty-five degrees, thereby indicating that the true wind angle is approximately equal to forty-five degrees.

The true wind direction may be the angle of the true wind relative to true north, i.e., a relative bearing of the true wind. In one implementation, the true wind indicator 230 may be oriented so that its angle relative to the true north indicator 222 is approximately equal to the true wind direction. For example, as illustrated in FIG. 2, the true wind indicator 230 may form an angle relative to the true north indicator 222 that may be equal to about 260 degrees, thereby indicating that the true wind direction is approximately equal to 260 degrees. In another implementation, the true wind indicator 230 may change color as it approaches a target angle, as described in more detail below.

The conning display 202 may also display a target indicator 240, where the target indicator 240 shows a bearing of a navigational location based on the compass scale 220. The target indicator 240 may be displayed along the compass scale 220, and may be based on a location provided by a user to the marine electronics device. The navigational location may be a waypoint, a point of interest, a mark, or any other navigational location known to those skilled in the art. The user may provide the location data in a variety of manners. In one implementation, where the marine electronics device displays chart data, the user may select the navigational location by using a cursor and making a selection from the displayed chart data. In another implementation, if the marine electronics device uses a touch screen, the user may touch the screen to select the navigational location from the displayed chart data. In other implementations, the navigational location may be manually entered into the marine electronics device by a user or may be selected from memory.

Based on the navigational location indicated by the target indicator 240, one or more laylines may be displayed on the conning display 202. A layline may be a line extending between a vessel and a navigational location which indicates a course the vessel may be able to sail on one tack in order to just pass to a windward side of the navigational location.

In one implementation, the conning display 202 may display a starboard layline 250, which may be a layline the vessel can sail where the direction of the true wind is towards a starboard side of the vessel. In such an implementation, the true wind indicator 230 may point towards a starboard side of the vessel marker 210. Similarly, the conning display 202 may display a port layline 260, which may be a layline the vessel can sail where the direction of the true wind is towards a port side of the vessel. In such an implementation, the true wind indicator 230 may point towards a port side of the vessel marker 210.

The laylines 250 and 260 may be integrated with the vessel marker 210 and/or the compass scale 220. In one implementation, the laylines 250 and 260 may extend from the vessel marker 210, and may each point to a relative bearing along the compass scale 220. Thus, a user of the conning display 202 may be able to observe the heading of the vessel relative to the laylines 250 and 260, and then may be able to adjust navigation of the vessel to sail along either layline. For example, as illustrated in FIG. 2, a user may have navigated the vessel to sail along the starboard layline 250. In such an example, the portion 212 of the vessel marker 210 representing the bow of the vessel may be substantially aligned with the starboard layline 250 at a heading of about 215 degrees. In addition, the port layline 260 may have a relative bearing of about 300 degrees. In another implementation, the user may use a bearing of the COG to adjust navigation of the vessel to sail along either layline.

The laylines 250 and 260 may be determined based on various types of wind, such as apparent wind, ground wind, true wind, and the like. In one implementation, a wind angle used to calculate the laylines 250 and 260 may be manually input by the user. In another implementation, the wind angle used to calculate the laylines 250 and 260 may be determined based on wind speeds and/or a lookup table used by instrumentation. In yet another implementation, the wind angle may be equal to the true wind angle. As mentioned earlier, the true wind indicator 230 may change color as it approaches a target angle. In such an implementation, the target angle may be the wind angle used to calculate the laylines and/or determined using the lookup table, and the true wind indicator 230 may change color as the true wind angle approaches a value that is equal to the wind angle.

In one implementation, the marine electronics device may determine the laylines 250 and 260 based on the navigational location indicated by the target indicator 240, the wind angle, and the true wind direction indicated by the true wind indicator 230. In such an implementation, the starboard layline 250 may be determined by subtracting the wind angle from a relative bearing of the true wind direction. For example, as illustrated in FIG. 2, the true wind indicator 230 may show a relative bearing of the true wind direction of about 260 degrees, and the wind angle may be determined to be about 45 degrees. Thus, the starboard layline 250 may be positioned at a bearing of about 215 degrees. Similarly, the port layline 260 may be determined by adding the wind angle to a relative bearing of the true wind direction. For example, as illustrated in FIG. 2, the port layline 260 may be positioned at a bearing of about 305 degrees.

Figure 3:
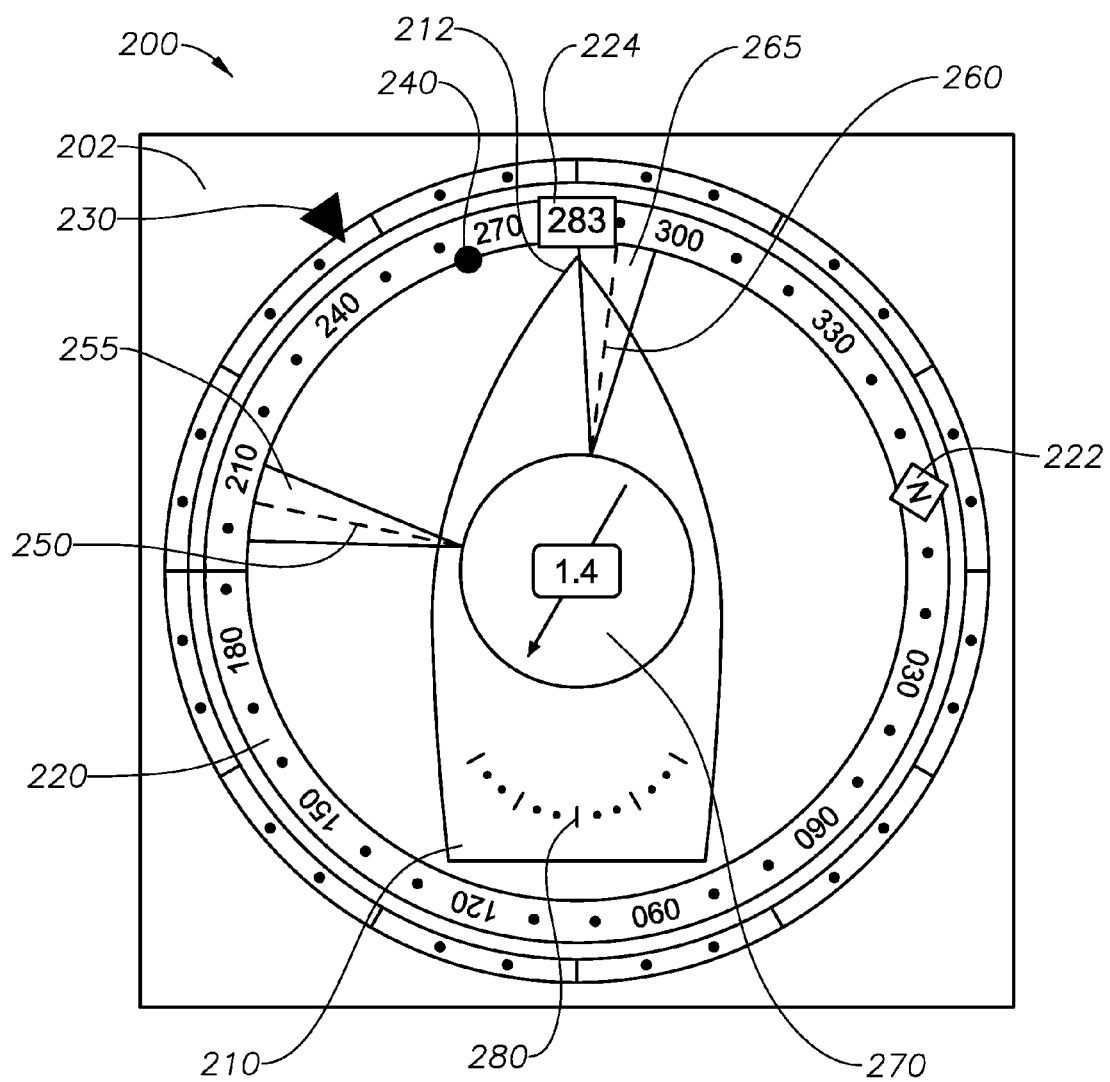
FIG. 3 illustrates a schematic diagram of a screen of a marine electronics device in accordance with implementations of various techniques described herein.

If the true wind direction indicated by the true wind indicator 230 changes as the vessel traverses through water, then the laylines 250 and 260 may also change. For example, as illustrated in FIG. 3, the true wind may move in a direction towards a port side of the vessel marker 210. Accordingly, the laylines 250 and 260 may change to reflect the change in the true wind direction. For example, as illustrated in FIG. 3, the true wind indicator 230 may show a relative bearing of the true wind direction of about 246 degrees, while the wind angle may again be determined to be about 45 degrees. Accordingly, the starboard layline 250 may be positioned at a bearing of about 201 degrees, and the port layline 260 may be positioned at a bearing of about 291 degrees. In another implementation, the laylines 250 and 260 may also change based on a change in calculated tide.

In one implementation, the conning display 202 may display a starboard layline history 255 and a port layline history 265. The starboard layline history 255 may show the lowest and the highest bearings for the starboard layline 250 over a most recent period of time. As shown in FIG. 2, the starboard layline history 255 may be displayed as a shaded area surrounding the starboard layline 250. The port layline history 265 may be similarly displayed with respect to the port layline 260. In one implementation, the period of time may range between about five minutes to about twenty minutes.

The conning display 202 may also show a calculated tide indicator 270, which is illustrated as an arrow indicating a direction of tide and/or current relative to the vessel marker 210 and the compass scale 220. The calculated tide indicator 270 may also include a numerical value of the tide and/or current. In one implementation, the calculated tide indicator 270 may be positioned in the center of the vessel marker 210. The conning display 202 may additionally show a rudder indicator 280, which indicates a position of the vessel's rudder with respect to the vessel marker 210. In one implementation, the rudder indicator 280 may be positioned proximate to a bottom of the vessel marker 210. The conning display 202 may display additional navigational data, such as in a lower right corner of the screen 200. The additional navigational data may include a name of an active waypoint, a magnetic heading reference, a magnetic variation value, and other data known to those skilled in the art.

In one implementation, the screen 200 may display chart data and/or radar data alongside the conning display 202. In another implementation, the screen 200 may overlay the conning display 202 over chart data and/or radar data.

Operation

Figure 4:
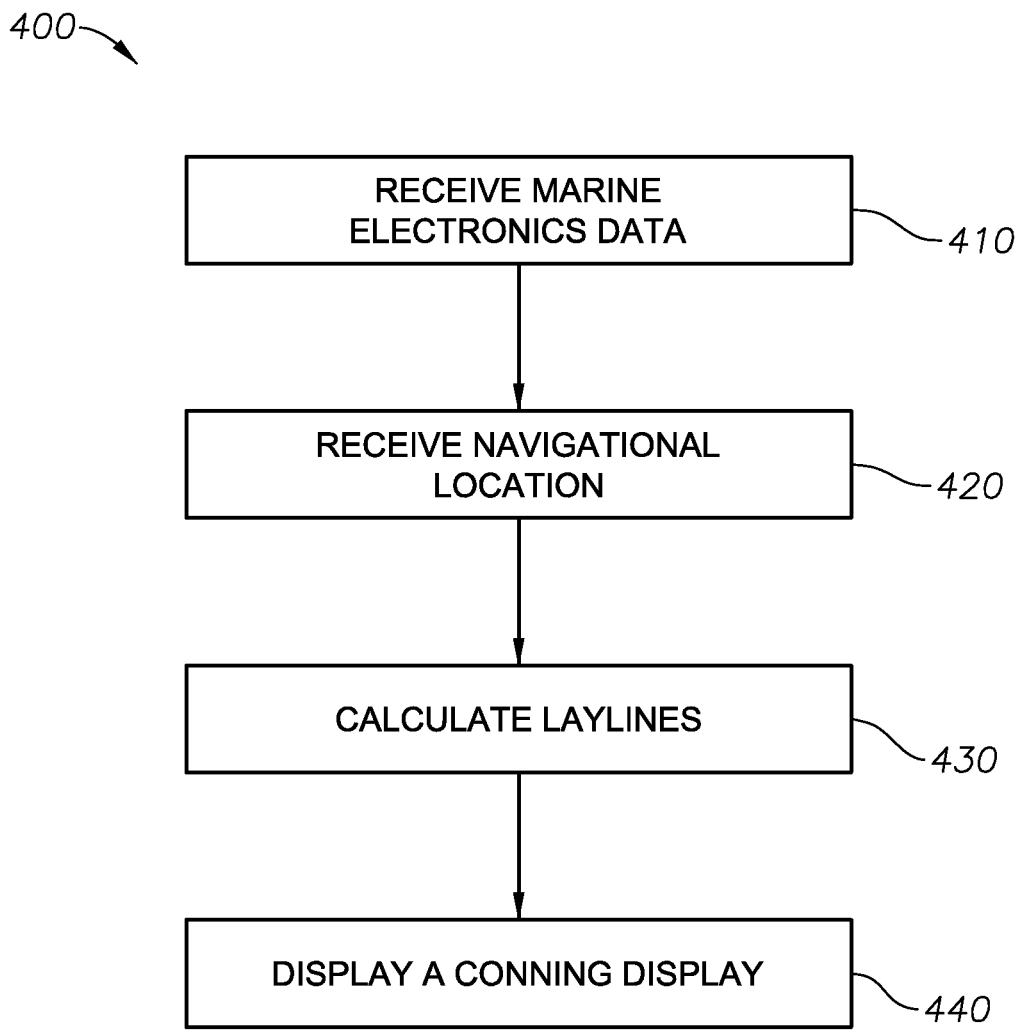
FIG. 4 illustrates a flow diagram of a method in accordance with implementations of various techniques described herein.

FIG. 4 illustrates a flow diagram of a method 400 in accordance with implementations of various techniques described herein. In one implementation, method 400 may be performed by a computer application, such a marine electronics device 199 onboard a vessel. It should be understood that while method 400 indicates a particular order of execution of operations, in some implementations, certain portions of the operations might be executed in a different order. Further, in some implementations, additional operations or steps may be added to the method 400. Likewise, some operations or steps may be omitted.

At step 410, the marine electronics device 199 may receive marine electronics data. As mentioned above, one or more marine electronics data modules, sensors, instrumentation, and/or any other devices disposed on the vessel may transmit marine electronics data to the marine electronics device 199. The marine electronics data may include chart data, sonar data, structure data, radar data, navigation data, or the like.

At step 420, the marine electronics device 199 may receive a navigational location. For example, a user may provide the navigational location based on displayed chart data by using a cursor and making a selection from the displayed chart data or by touching the navigational location on the screen 105.

At step 430, the marine electronics device 199 may calculate one or more laylines based on the navigational location, a wind angle, and the marine electronics data. The marine electronics data may include a true wind direction and a true wind angle.

At step 440, the marine electronics device 199 may display a conning display. The conning display may include the one or more laylines calculated in step 430 integrated with a vessel marker 210 and a compass scale 230.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving marine electronics data at a marine electronics device disposed on a vessel;
   receiving a navigational location;
   calculating a plurality of laylines based on the navigational location and the marine electronics data, wherein the plurality of laylines comprise a starboard layline and a port layline; and
   displaying a vessel marker representing the vessel, a compass scale, the laylines, and one or more layline histories on a display screen of the marine electronics device, wherein the vessel marker, the compass scale, and the laylines are integrated on the display screen, and wherein the laylines and the one or more layline histories extend from the vessel marker.

2. The method of claim 1, wherein the compass scale is displayed around the vessel marker such that the vessel marker is centered within the compass scale.

3. The method of claim 1, wherein the laylines point to a relative bearing along the compass scale.

4. The method of claim 1, wherein the laylines are calculated based on the navigational location, a wind direction, and a wind angle.

5. The method of claim 1, wherein displaying the one or more layline histories comprises displaying a shaded area representing a lowest and a highest bearing for the laylines over a most recent period of time.

6. The method of claim 1, further comprising displaying a wind indicator, wherein the wind indicator changes color based on a comparison to a target angle.

7. A non-transitory computer-readable medium having stored thereon a plurality of computer-executable instructions which, when executed by a computer, cause the computer to:
   receive marine electronics data at a marine electronics device disposed on a vessel;
   receive a navigational location;
   calculate a plurality of laylines based on the navigational location and the marine electronics data; and
   display a vessel marker representing the vessel, a compass scale, the laylines, and one or more layline histories on a display screen of the marine electronics device, wherein:
   the vessel marker, the compass scale, and the laylines are integrated on the display screen;
   the laylines and the one or more layline histories extend from the vessel marker; and
   the one or more layline histories comprise a shaded area representing a lowest and a highest bearing for the laylines over a most recent period of time.

8. The non-transitory computer-readable medium of claim 7, wherein the compass scale is displayed around the vessel marker, such that the vessel marker is centered within the compass scale.

9. The non-transitory computer-readable medium of claim 7, wherein the laylines point to a relative bearing along the compass scale.

10. The non-transitory computer-readable medium of claim 7, wherein the plurality of computer-executable instructions which, when executed by the computer, cause the computer to calculate the laylines by adding a wind angle from a relative bearing of a wind direction.

11. The non-transitory computer-readable medium of claim 7, wherein the laylines change based on changes to at least one of a wind direction and a wind angle.

12. The non-transitory computer-readable medium of claim 7, wherein the plurality of computer-executable instructions which, when executed by the computer, cause the computer to display the vessel marker, the compass scale, and the laylines in conjunction with at least one of chart data or radar data.

13. An apparatus for displaying marine electronics data, said apparatus comprising:
   one or more processors;
   a display screen configured to display the marine electronics data;
   memory having a plurality of executable instructions which, when executed by the one or more processors, cause the one or more processors to:
   receive the marine electronics data at a marine electronics device disposed on a vessel;
   receive a navigational location;
   calculate a plurality of laylines based on the navigational location and the marine electronics data; and
   display a vessel marker representing the vessel, a compass scale, a heading indicator which indicates a heading of the vessel, a true wind indicator which displays an angle and a direction of wind relative to the vessel marker, the laylines, and one or more layline histories on a display screen of the marine electronics device, wherein:
   the vessel marker, the compass scale, the heading indicator, the true wind indicator, and the laylines are integrated on the display screen; and
   the laylines and the one or more layline histories extend from the vessel marker.

14. The apparatus of claim 13, wherein the compass scale is displayed around the vessel marker, such that the vessel marker is centered within the compass scale.

15. The apparatus of claim 13, wherein the laylines point to a relative bearing along the compass scale.

16. The apparatus of claim 13, wherein the plurality of computer-executable instructions which, when executed by the computer, cause the computer to display the vessel marker, the compass scale, and the laylines in conjunction with at least one of chart data or radar data.

17. The apparatus of claim 13, wherein the plurality of computer-executable instructions which, when executed by the computer, cause the computer to display:
   a true north indicator which indicates a direction for true north relative to the vessel;
   a course over ground (COG) indicator which indicates a direction for COG for the vessel;
   a target indicator which shows a bearing of the navigational location based on the compass scale;
   a calculated tide indicator which indicates a direction of tide relative to the vessel marker and the compass scale;

a rudder indicator which indicates a position of the vessel's rudder with respect to the vessel marker;
navigational data; or
combinations thereof.

* * * * *